United States Patent
Wien et al.

(10) Patent No.: US 9,831,758 B2
(45) Date of Patent: Nov. 28, 2017

(54) MASTER/SLAVE CONTROLLER SYSTEM IN RING TOPOLOGY FOR MODULAR MULTILEVEL CONVERTERS

(71) Applicant: ABB Schweiz AG, Baden (CH)

(72) Inventors: Tormod Wien, Asker (NO); Anne Vallestad, Sandvika (NO); Dalimir Orfanus, Nesøya (NO); Harald Vefling, Nøtterøy (NO); Reidar Indergaard, Kolsås (NO)

(73) Assignee: ABB SCHWEIZ AG, Baden (CH)

( * ) Notice: Subject to any disclaimer, the term of this patent is extended or adjusted under 35 U.S.C. 154(b) by 13 days.

(21) Appl. No.: 15/112,585

(22) PCT Filed: Jan. 19, 2015

(86) PCT No.: PCT/EP2015/050875
§ 371 (c)(1),
(2) Date: Jul. 19, 2016

(87) PCT Pub. No.: WO2015/107187
PCT Pub. Date: Jul. 23, 2015

(65) Prior Publication Data
US 2016/0352208 A1 Dec. 1, 2016

(30) Foreign Application Priority Data
Jan. 20, 2014 (EP) ..................... 14151739

(51) Int. Cl.
*H02M 1/088* (2006.01)
*H02M 1/084* (2006.01)
(Continued)

(52) U.S. Cl.
CPC ............. *H02M 1/088* (2013.01); *H02M 1/08* (2013.01); *H02M 1/0845* (2013.01);
(Continued)

(58) Field of Classification Search
CPC ....... H02M 2007/4835; H02M 1/4208; H02M 1/42; H02M 1/4216; H02M 1/088; H02M 1/092
See application file for complete search history.

(56) References Cited

U.S. PATENT DOCUMENTS 6,169,679 B1  1/2001  Deng et al.
8,130,501 B2 * 3/2012  Ledezma ............... H02M 7/003
                                                    307/10.6
(Continued)

FOREIGN PATENT DOCUMENTS

DE  10 2005 045 957 A1  11/2006
EP     2 458 726 A1      5/2012
(Continued)

OTHER PUBLICATIONS

Celavonic et al., "A new distributed digital controller for the next generation of power electronics building blocks", Applied Power Electronics Conference and Exposition, 2000, Fifteenth Annual IEEE, vol. 2, Feb. 6, 2000, pp. 889-894, XP010371679, DOI: 10.1109/APEC.2000.822610, ISBN: 978-0-7803-5864-5.
(Continued)

*Primary Examiner* — Jeffrey Gblende
*Assistant Examiner* — Kyle J Moody
(74) *Attorney, Agent, or Firm* — Birch, Stewart, Kolasch & Birch, LLP

(57) ABSTRACT

A power electronic converter for converting electric energy and a method for controlling a power electronic converter are disclosed. The converter includes a plurality of PE switches, and a control system adapted to transmit control information to the PE switches. The control system includes a master controller and a plurality of local controllers controlling the PE switches. The control system further includes one or more slave devices controlled by the master controller. The control system is configured so that the
(Continued)

master controller and the one or more slave devices are connected in a ring network topology. Each slave device and one or more of the local controllers are connected in a star network topology.

20 Claims, 4 Drawing Sheets

(51) Int. Cl.
*H02M 7/483* (2007.01)
*H02M 1/08* (2006.01)
*H04L 12/46* (2006.01)

(52) U.S. Cl.
CPC ........ *H02M 7/483* (2013.01); *H04L 12/4637* (2013.01); *H02M 2007/4835* (2013.01)

(56) References Cited

U.S. PATENT DOCUMENTS

| | | | | |
|---|---|---|---|---|
| 8,817,503 B2* | 8/2014 | Inoue | ............... | H02M 1/08 363/127 |
| 9,214,871 B2* | 12/2015 | Tsuchiya | ............... | H02M 7/49 |
| 9,325,258 B2* | 4/2016 | Korn | ............... | H02M 7/53871 |
| 9,680,392 B2* | 6/2017 | Song | ............... | H02M 7/49 |
| 2003/0137856 A1 | 7/2003 | Sheng et al. | | |
| 2004/0208029 A1* | 10/2004 | Caruthers | ............... | G08C 19/00 363/72 |
| 2008/0188992 A1 | 8/2008 | Ebbinghaus et al. | | |
| 2008/0218320 A1* | 9/2008 | Jang | ............... | H02M 7/49 363/1 |
| 2011/0267854 A1 | 11/2011 | Flannery et al. | | |
| 2013/0223115 A1 | 8/2013 | Tsuchiya et al. | | |
| 2014/0365792 A1* | 12/2014 | Yun | ............... | G06F 1/3212 713/320 |

FOREIGN PATENT DOCUMENTS

| | | |
|---|---|---|
| EP | 2 549 634 A1 | 1/2013 |
| EP | 2 905 889 A1 | 8/2015 |
| JP | 11-196564 A | 7/1999 |
| WO | WO 2011/120572 A1 | 10/2011 |
| WO | WO 2013/178249 A1 | 12/2013 |

OTHER PUBLICATIONS

Liu, "Distributed Modular Controller Architecture for High Power Converter Applications", Thesis of NC State University, 2010, 125 pages, See p. 16, 18-24.

* cited by examiner

MASTER/SLAVE CONTROLLER SYSTEM IN RING TOPOLOGY FOR MODULAR MULTILEVEL CONVERTERS

FIELD OF THE INVENTION

The present invention relates to a power electronic converter for converting electric energy. The converter comprises a plurality of power electronic switches, further denoted PE switches, and a control system adapted to transmit control information to the PE switches so that the PE switches are switched in a synchronized manner. The control system comprises a master controller and a plurality of local controllers that controls the PE switches.

The present invention further relates to method for controlling a power electronic converter.

PRIOR ART

Power electronic converters are used for reforming electric power from a first form to a second form, such as between alternating current and direct current, or from a first voltage to a second voltage.

The converter comprises a plurality of PE switches that are changed in a specific synchronized manner between a connected state and a disconnected state by means of transmitting control signal from the master controller to the PE switches. Furthermore, status information of the PE switches is transmitted from the PE switches to the master controller that uses the status information to adjust the control signal so that the specific synchronization for reforming the electric power is maintained.

In prior art power electronic converters optical fibers are used for transmitting control signals and status information between the master controller and the PE switches. A problem with prior art converters is that the optical fibers are expensive and that it is a complex process to establish connection between the plurality of PE switches and the master controller. Furthermore, connection must be established so that electric isolation is provided between devices under different potential.

A further problem is that it is difficult to modify the converter for a new function in so far that the modification would involve adding or removing PE switches. Such modification would require rewiring of optical fibers in the convertor, which is time consuming and expensive. Also repairing the convertor by replacing PE switches is difficult.

US2011267854 discloses a power converter comprising a master control node and a plurality of slave nodes arranged in a ring network. The network comprises a first and a second communication channel.

US2008188992 discloses a high voltage switch gear comprising one or more switching devices. The switch gear comprises a control centre connected to the one or more switching devices. The switching devices are arranged in a ring network.

OBJECTS AND SUMMARY OF THE INVENTION

A first object of the present invention is to provide a power electronic converter that can be assembled easier and more cost effective than prior art power electronic converters. A second object of the present invention is to provide a power electronic converter that can be repaired and modified easier than prior art power electronic converters.

These objects are obtained by a power electronic converter according to claim 1. The converter is characterized in that the control system further comprises one or more slave devices controlled by the master controller, wherein the control system is configured so that the master controller and the one or more slave devices are connected in a ring network topology, and each slave device and one or more of the local controllers are connected in a star network topology.

The converter comprises a combination of a ring and a star network for transferring control signals to the PE switches. The ring network of slave devices is arranged so that each slave device is a central node to which one or more of the local controllers are connected.

The network arrangement with a combination of a ring and a star network facilitates addition or removal of PE switches from the converter. Accordingly, the power converter of the invention is easier to repair and modify than prior art power converters.

The function of the master controller is to execute a control algorithm for the operation of the converter and transmit control information to the PE switches so that the PE switches are changed between the connected state and the disconnected state. The master controller also is adapted to receive information on the state of the converter and power grid, for example the current through each branch, the voltage over the converter and environmental parameters, such as temperature.

The function of the slave devices is to act as a communication node for control signals and information from the PE switches for adjusting the control signals so that the PE switched are switched in a synchronized manner.

The function of the local controller is to directly control one or more PE switches by transmitting control signals and receiving control information. According to an embodiment of the invention, the converter comprises a plurality of cells, each including two or more PE switches, wherein each the local controller controls the PE switches of one or more cells. Thereby, the converter can easily be modified by simply adding or removing the local controller with its PE switch or PE switches to/from the slave device. Accordingly, repair and modification of the converter is facilitated.

According to an embodiment of the invention, the control system comprises a plurality of slave devices, each of the slave devices connecting a portion of the local controllers in a star network topology. The use of a plurality of slave devices has the advantage that converter can be designed so that different slave devices are arranged for different functions. Thereby, functions can easily by added or removed from the converter by simply adding or removing a slave device with thereto connected local controllers and their PE switches. Accordingly, modification of the converter is facilitated.

According to an embodiment of the invention, each local controller is directly in control of its designated PE switch or PE switches. The local controllers transmit control information directly to the PE switches.

According to an embodiment of the invention, the slave devices are configured to control and communicate with the connected local controllers by means of wireless communication.

By means of the wireless communication between the slave devices and their local controllers, the modification of the converter by adding or removing local controllers and their designated PE switches is facilitated compared with prior art converters. For example, the wireless communication is realized by means of a Free Space Optical (FSO). The wireless communication enables the current optical fiber solution in prior art to be replaced while providing the same properties, such as high voltage insulation and fast and reliable communication, but without having to deal with complex and expensive installation.

According to an embodiment of the invention, the one or more local controllers and their PE switches are combined to one or more building blocks in the converter. The building blocks can be used for manufacturing, modifying or repairing the converter in a modular manner.

According to an embodiment of the invention, the local controllers are configured to control and communicate with its designated PE-switch or switches by means of wired communication. For example, the wired communication between the local controllers and the PE switches are established by means of optical fibers.

According to an embodiment of the invention, the master controller comprises means for transmitting control information in both directions of the ring network. Thereby, communication with all slave devices can be established in the event of a malfunction of the transmission of signals between two adjacent slave devices.

According to an embodiment of the invention, the communication in the ring network is based on an Ethernet protocol.

According to an embodiment of the invention, the ring network comprises one or more Ethernet rings.

According to an embodiment of the invention, at least one of the one or more Ethernet rings is redundant.

According to an embodiment of the invention, the PE switches are IGBT switches or IGCT switches.

According to an embodiment of the invention, the control system is configured to provide time synchronization between the one or more slave devices and the local controllers.

According to an embodiment of the invention, each slave device comprises a clock unit and the master controller is configured to estimate the delay of the control information through each slave device, calculate for each slave device a new clock setting to be set, and include information on the new clock setting for the slave devices with the control information, wherein the slave devices are configured upon receiving the control information adjust its clock setting to the new clock setting. Thereby, the converter is provided with a predictable synchronized message scheme that assures that the PE switches are changed in the specific synchronized manner so that the electric power is converted from the first form to the second form.

The invention further relates to a method for controlling a power electronic converter according to claim 13. The method comprises the steps of:
transmitting control information from the master controller to the one or more slave devices,
transmitting control information from each slave device to its connected local controllers, and
transmitting control information from each local controllers to its designated PE switch.

According to an embodiment of the invention, the method comprises the steps of:
receiving information on the current state of the converter and properties of the power to be converted.

According to an embodiment of the invention, the information on the current state of the converter comprises status information of the PE switches, the method comprises the steps of:
transmitting the status information from the PE switches through the local controllers and the slave devices to the master controller.

According to an embodiment of the invention, the method comprises the steps of:
estimating the delay of the control information through each slave device,
calculating for each slave device a new clock setting to be set,
transmitting control information from the master controller to the one or more slave devices together with the information on the new clock setting for the slave devices, and
setting the clock unit of each slave device to the new clock setting upon receipt of the control information together with the information on the new clock setting.

According to an embodiment of the invention, the method comprises the steps of:
transmitting control information from the slave devices to the one or more local controllers together with the information on the new clock setting for the local controllers, and
setting the clock unit of each local controller to the new clock setting upon receipt of the control information together with the information on the new clock setting.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1A:
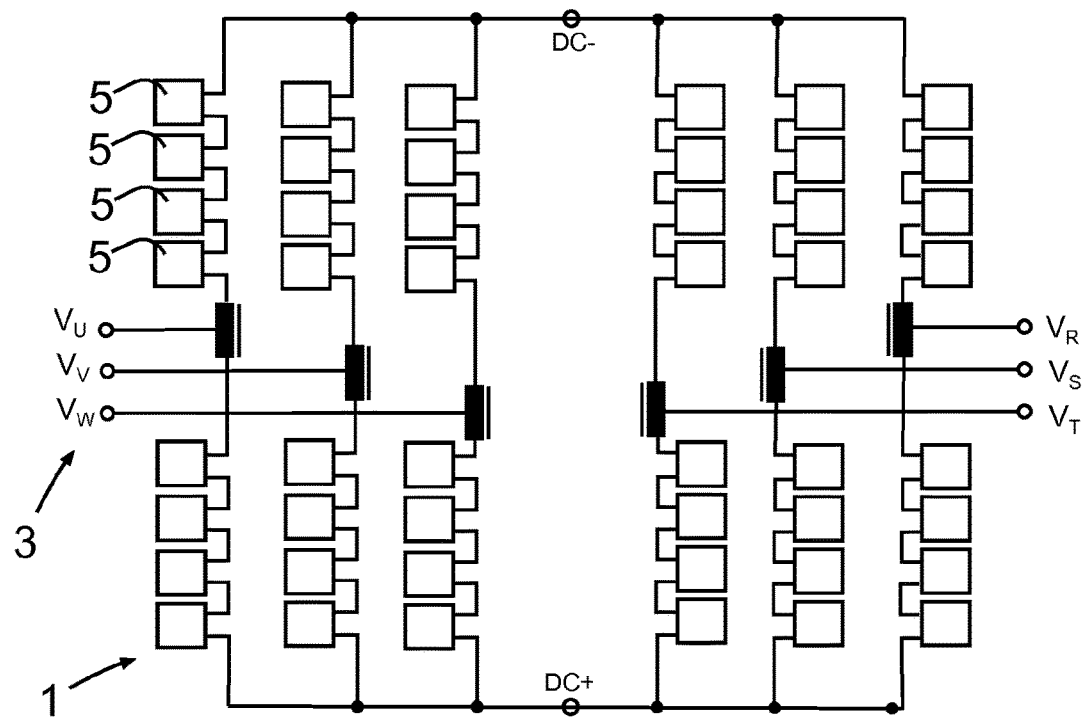
FIG. 1a shows an example of the structure of a power electronic converter connected to a power grid.
Figure 1B:
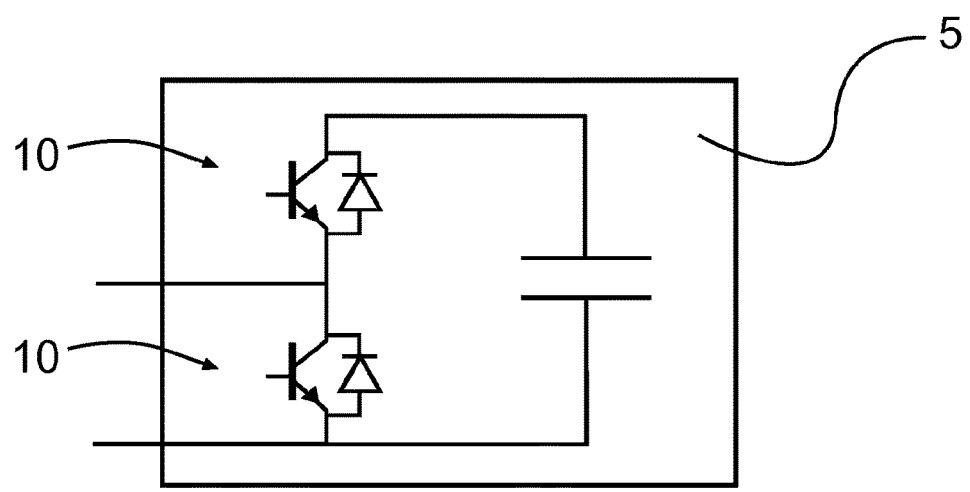
FIG. 1b shows an example of a unipolar cell comprising PE switches.

FIG. 1 shows an example of the structure of a power electronic converter 1 connected to a three phase power grid 3. The converter 1 comprises a plurality of unipolar cells 5 that comprises one or more PE switches 10. In FIG. 1b an example of a unipolar cell 5 is shown. The unipolar cell 5 comprises two PE switches 10 and a capacitor. The PE switches 10 are for example IGBT switches or IGCT switches.

The converter 1 is adapted to convert electric power from a first form to a second form by changing the PE switches 10 between a connected state and a disconnected state in a specific synchronized manner.

Figure 2:
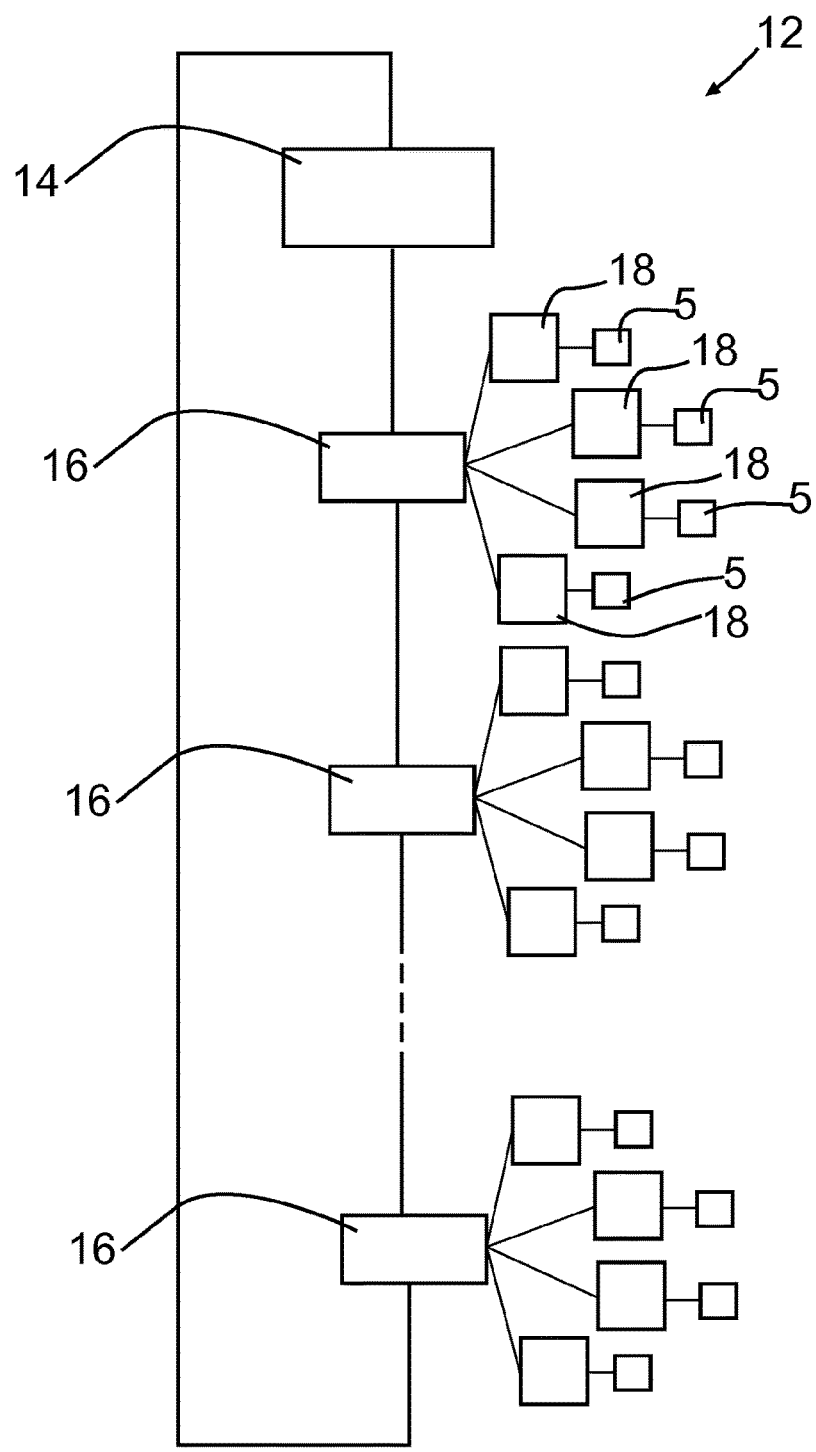
FIG. 2 shows an example of a control system of a power electronic converter according to an embodiment of the invention.

The change of the PE switches 10 is controlled by a control system 12. FIG. 2 shows an example of a control system 12 of a power electronic converter 1 according to an embodiment of the invention.

The control system 12 comprises a master controller 14, a plurality of slave devices 16, and a plurality of local controllers 18 that each connects a cell 5, as shown in FIG. 1b, with two PE switches 10.

The converter 1 further comprises sensor means for measuring different operational parameters of the converter 1, for example the current through each branch, the voltage over the converter 1 and environmental parameters, such as temperature.

The master controller 14 transmits control information to the PE switches 10 and receiving status information from different components of the converter 1 through the communication network of slave devices 16 and local controllers 18. The status information comprises information from the sensor means. The status information is used by the master controller 14 for adjusting the control information to the PE switches 10.

The communication network is arranged so the master controller 14 and the slave devices 16 are arranged in a ring network topology. Preferably, the ring network is wireless network based on an Ethernet protocol.

Furthermore, it is preferable to arrange ring network with redundancy. According to an embodiment the master controller 14 is configured to transmit and receive information in both direction of the ring network of slave devices 16. Furthermore, the ring network may be arranged by one or more redundant Ethernet rings.

The communication network is further arranged so that the each slave device 16 connects a plurality of local controller 18 in a star network. Each of the local controllers 18 of the star network are connected to a designated PE switch 10. Accordingly, each slave device 16 is a central node to which one or more of the local controllers 18 are connected.

The one or more star networks of local controllers 18 connected to their central slave device 16 provides a modular design that enables repair and modification of the power converter 1 by adding or removing local controllers 18 with thereto connected PE switch 10 or switches 10.

The invention provides a converter 1 that can be modified and repaired in more easy way than prior art converters. Furthermore, the wireless communication reduces the cost of the converter 1 in that the less optical fibers are used. Furthermore, the modification or repair of the converter 1 is faster than prior art converter in that no wiring of optical fibers is necessary.

Preferably, one or more local controllers 18 and their designated PE switch 10 or PE switches 10 are combined to a building blocks that can be used for manufacturing, modifying or repairing the converter 1 in a modular manner that accordingly can be done in a faster, more flexible and easier manner than for prior art converters 1.

During operation of the converter 1, the master controller 14 transmits control information to the PE switches 10 through the ring network of slave devices 16 and the star network of local controllers 18. The master controller 14 is also configured to receive status information from the PE switches 10 through the network.

Preferably, the master controller 14 is configured to synchronize the slave devices 16 and the local controllers 18 during operation of the converter 1.

Figure 3:
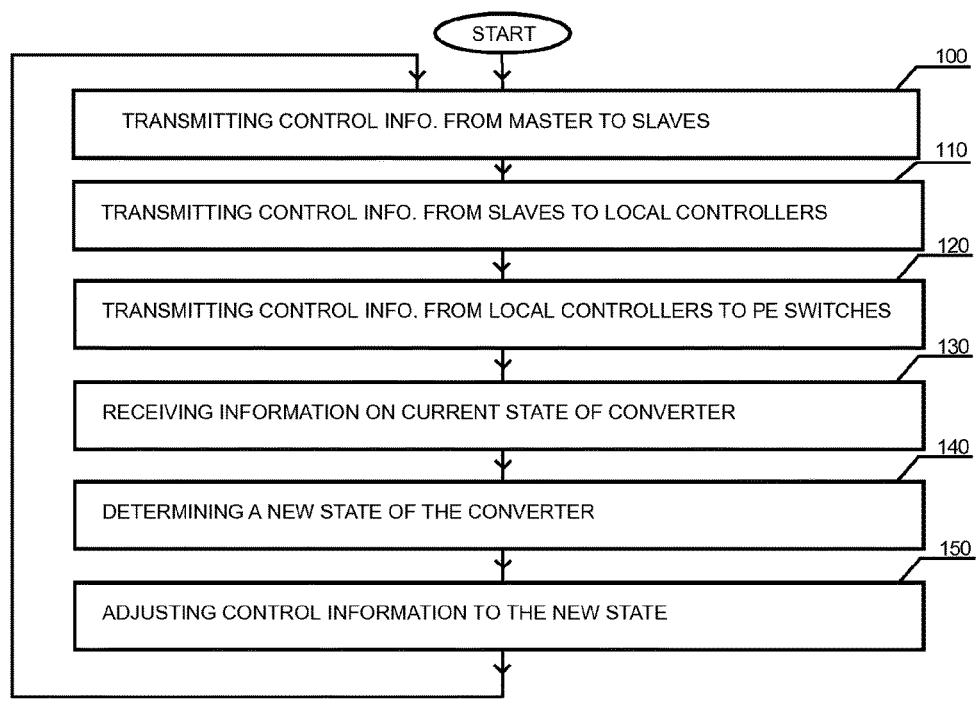
FIG. 3 shows a flow chart of a first embodiment of a method for controlling a power electronic converter according to the invention.

FIG. 3 shows a flow chart of a method for controlling a power electronic converter 1 according to the invention.

In a step 100, the method comprises transmitting control information from the master controller 14 to the one or more slave devices 16. The control information from the master controller 14 is transmitted in either direction of the ring network of the master controller 14 and the slave devices 16. Thereafter, the method comprises, in a step 110, transmitting control information from each slave device 16 to its connected one or more local controllers 18, and, in a step 120, the method comprises transmitting control information from each local controllers 18 to its designated PE switch 10.

The PE switches 10 are configured to transmit status information, such as information on the time of switching between the connected state and the disconnected state. The method comprises, in a step 130, receiving information on the current state of the converter 1 and properties of the power to be converted. The status information from the PE switches 10 is transmitted from the PE switches 10 through the local controllers 18 and the slave devices 16 to the master controller 14.

The method further comprises, in a step 140, determining a new state of the converter 1 on basis of the current state of the converter 1 and properties of the power to be converted. Thereafter, the method comprises, in a step 150, adjusting the control information so that the state of the converter 1 is changed to the new state. Thereby, precise operation of the converter 1 can be assured.

Figure 4:
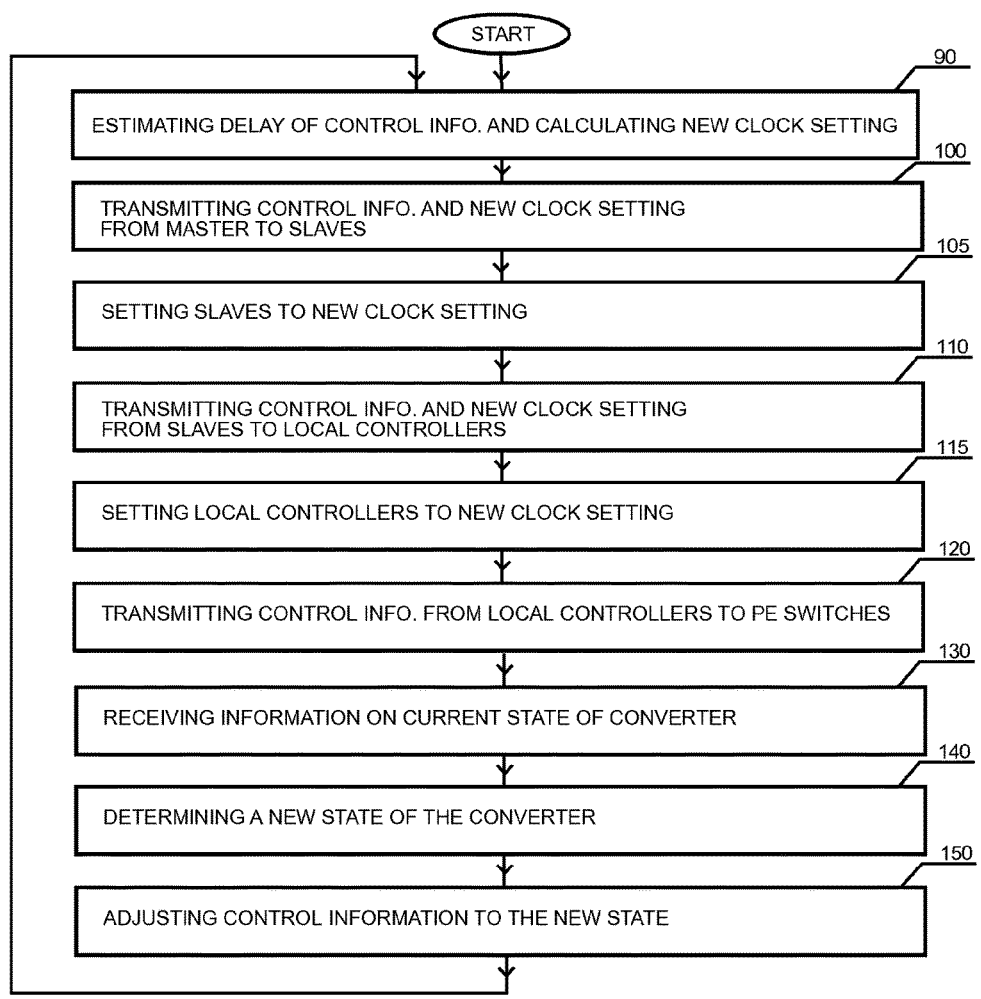
FIG. 4 shows a flow chart of a second embodiment of a method for controlling a power electronic converter according to the invention.

FIG. 4 shows a flow chart of a second embodiment of a method for controlling a power electronic converter 1 according to the invention. The method comprises the same method steps as the embodiment in FIG. 3 with the addition of steps for synchronizing the slave devices 16 and the local controllers 18 with the clock unit of the master controller 14.

The method comprises, in a step 90, estimating the delay of the control information through each slave device 16, and calculating for each slave device 16 a new clock setting to be set. In a step 100, the method comprises transmitting control information from the master controller 14 to the one or more slave devices 16 together with the information on the new clock setting for the slave devices 16, and in a step 105, setting the clock unit of each slave device 16 to the new clock setting upon receipt of the control information together with the information on the new clock setting.

In a step 110, the method comprises transmitting control information from the slave devices 16 to the one or more local controllers 18 together with the information on the new clock setting for the local controllers 18, and in a step 115, setting the clock unit of each local controllers 18 to the new clock setting upon receipt of the control information together with the information on the new clock setting.

The present invention is not limited to the disclosed embodiments but may be modified within the framework of the claims.

The invention claimed is:

1. A power electronic converter for converting electric energy, the converter comprising: a plurality of cells, each of the plurality of cells including a plurality of power electronic (PE) switches; and a control system adapted to transmit control information to the plurality of PE switches so that the PE switches are switched in a synchronized manner, wherein the control system comprises: a master controller; a plurality of local controllers, each of the plurality of local controllers for controlling the PE switches of one or more of the plurality of cells; and a plurality of slave devices controlled by the master controller, wherein the control system is configured so that the master controller and the plurality of slave devices are connected in a ring network topology, and each slave device connects a plurality of the local controllers in a star network topology.

2. The power electronic converter according to claim 1, wherein the slave devices are configured to control and communicate with the connected local controllers by means of wireless communication.

3. The power electronic converter according to claim 2, wherein the one or more local controllers and their PE switches are combined to one or more building blocks in the converter.

4. The power electronic converter according to claim 2, wherein the master controller comprises means for transmitting control information in both directions of the ring network.

5. The power electronic converter according to claim 2, wherein the communication in the ring network is based on an Ethernet protocol.

6. The power electronic converter according to claim 2, wherein the ring network comprises one or more Ethernet rings.

7. The power electronic converter according to claim 1, wherein the one or more local controllers and their PE switches are combined to one or more building blocks in the converter.

8. The power electronic converter according to claim 7, wherein the master controller comprises means for transmitting control information in both directions of the ring network.

9. The power electronic converter according to claim 7, wherein the communication in the ring network is based on an Ethernet protocol.

10. The power electronic converter according to claim 7, wherein the ring network comprises one or more Ethernet rings.

11. The power electronic converter according to claim 1, wherein the master controller comprises means for transmitting control information in both directions of the ring network.

12. The power electronic converter according to claim 11, wherein the communication in the ring network is based on an Ethernet protocol.

13. The power electronic converter according to claim 1, wherein the communication in the ring network is based on an Ethernet protocol.

14. The power electronic converter according to claim 1, wherein the ring network comprises one or more Ethernet rings.

15. The power electronic converter according to claim 14, wherein at least one of the one or more Ethernet rings is redundant.

16. The power electronic converter according to claim 1, wherein the PE switches are IGBT switches or IGCT switches.

17. The power electronic converter according to claim 1, wherein the control system is configured to provide time synchronization between the one or more slave devices and the local controllers.

18. A method for controlling the power electronic converter according to claim 1, the method comprises: transmitting control information from the master controller to the one or more slave devices; transmitting control information from each slave device to connected local controllers; and transmitting control information from each local controller to a designated PE switch.

19. The method according to claim 18, further comprising: receiving information on a current state of the converter and properties of power to be converted; determining a new state of the converter on a basis of the current state of the converter and properties of the power to be converted; and adjusting the control information to the plurality of PE switches so that the current state of the converter is changed to the new state.

20. The method according to claim 19, wherein the information on the current state of the converter comprises status information of the PE switches, the method further comprising transmitting the status information from the PE switches through the local controllers and the slave devices to the master controller.

* * * * *